US006713749B2

(12) United States Patent
Wu et al.

(10) Patent No.: US 6,713,749 B2
(45) Date of Patent: Mar. 30, 2004

(54) MONOLITHIC LOSS-OF-SIGNAL DETECT CIRCUITRY

(75) Inventors: Adam A. Wu, Thousand Oaks, CA (US); Balagopal Mayampurath, Camarillo, CA (US)

(73) Assignee: Vitesse Semiconductor Corporation, Camarillo, CA (US)

( * ) Notice: Subject to any disclaimer, the term of this patent is extended or adjusted under 35 U.S.C. 154(b) by 0 days.

(21) Appl. No.: 09/976,511

(22) Filed: Oct. 11, 2001

(65) Prior Publication Data

US 2002/0066850 A1 Jun. 6, 2002

Related U.S. Application Data

(60) Provisional application No. 60/239,786, filed on Oct. 11, 2000.

(51) Int. Cl.[7] .............................. H01J 40/14; H03F 3/04; H03F 3/08; H01L 31/00
(52) U.S. Cl. ............................... 250/214 A; 250/214 C; 250/214 LA; 250/214 R; 330/288; 330/308; 327/514
(58) Field of Search ....................... 250/214 A, 214 LA, 250/214 R, 214 C; 330/288, 308; 327/514

(56) References Cited

U.S. PATENT DOCUMENTS

| | | | |
|---|---|---|---|
| 4,893,002 A | * | 1/1990 | Kollanyi |
| 5,160,850 A | * | 11/1992 | Spirig |
| 5,202,553 A | * | 4/1993 | Geller |
| 5,286,969 A | * | 2/1994 | Roberts |
| 5,329,115 A | * | 7/1994 | Lim |
| 5,373,388 A | | 12/1994 | Betts ........................... 359/189 |
| 5,563,893 A | | 10/1996 | Lai ................................ 371/6 |
| 5,929,689 A | | 7/1999 | Wall ............................ 327/362 |
| 5,953,690 A | * | 9/1999 | Lemon et al. |
| 6,057,738 A | | 5/2000 | Ku et al. ..................... 330/308 |
| 6,072,609 A | | 6/2000 | Masuda ....................... 359/110 |
| 6,084,478 A | | 7/2000 | Mayampurath ............. 330/308 |
| 6,208,446 B1 | * | 3/2001 | Faifman |
| 6,218,905 B1 | | 4/2001 | Sanders et al. ............. 330/308 |
| 6,242,732 B1 | | 6/2001 | Rantakari ............... 250/214 A |
| 6,275,541 B1 | | 8/2001 | Nagahori et al. ........... 375/318 |

OTHER PUBLICATIONS

Maxim *1bgps, High–Speed Limiting Amplifier with Chatter–Free Loss–of Signal Detection*, Maxim Integrated Products, 19–0324; Rev 2; 12/97, pp. 1–8.

* cited by examiner

*Primary Examiner*—David Porta
*Assistant Examiner*—David C. Meyer
(74) *Attorney, Agent, or Firm*—Christie, Parker & Hale, LLP

(57) ABSTRACT

A Loss Of Signal (LOS) circuit in an opto-electronic receiver circuit. The LOS circuit includes a current to voltage converter and a comparator circuit. The current to voltage circuit receives a current signal including a DC current signal component from a photodetector circuit included in the opto-electronic receiver. The current to voltage receiver generates a voltage signal in response to the DC current signal. The comparator circuit receives the voltage signal from the current to voltage circuit and generates a LOS signal from the voltage signal by comparing the voltage signal to a reference voltage signal.

18 Claims, 5 Drawing Sheets

MONOLITHIC LOSS-OF-SIGNAL DETECT CIRCUITRY

CROSS-REFERENCE TO RELATED APPLICATION

This application claims the benefit of provisional Application 60/239,786, filed Oct. 11, 2000, the disclosure of which is incorporated herein by reference.

BACKGROUND OF THE INVENTION

This invention relates generally to opto-electronic receivers and more specifically to loss-of-signal detection by an opto-electronic receiver.

High speed communication systems often transmit data using lightwaves transmitted over fiber-optic cables. Opto-electronic receivers receive the transmitted data as lightwaves, and form corresponding electrical signals for use by computerized systems.

In the receiver, the lightwaves generally impinge on a photodetector generating a current. The current is generally provided to a transimpedance amplifier where it is translated to a voltage and amplified. As the current is often small, care must often be used in designing the transimpedance amplifier, and possible further amplifying stages, to obtain useable signals.

It is sometimes useful for an opto-electronic receiver to have the ability to detect a Loss-of-Signal (LOS) occurrence. A LOS may occur for a variety of reasons and causes. A laser source may fail, a fiber optic cable may be sliced, or various other problems may occur. In addition, even a partial loss of signal strength may be sufficient to result in degraded system operation when an optical source, such as an optical source coupled to the opto-electronic receiver via a fiber optic cable, is disconnected.

The small current generated by the photodetector presents difficulties in monitoring for LOS. The use of, for example, a peak detector, may require greater signal strength, and therefore the use of a signal some distance down the amplification stage. Use of such a signal, however, may result in erroneous LOS determination due to process, temperature, and other variations. Moreover, to avoid signal attenuation the components must often be placed close to the amplification stages, presenting layout difficulties.

SUMMARY OF THE INVENTION

The present invention provides a DC coupled Loss of Signal circuit. One embodiment of the invention comprises a loss of signal circuit. The loss of signal circuit is in an opto-electronic receiver, the opto-electronic receiver having a transimpedance amplifier AC coupled to a photodetector. The loss of signal circuit comprises a current-to-voltage circuit DC coupled to the photodetector, the current-to-voltage circuit receiving a DC current signal generated by the photodetector and providing a DC voltage signal. The loss of signal circuit further comprises a comparater coupled to the current-to-voltage circuit, the comparater receiving the DC voltage signal and providing a loss of signal signal.

In a further embodiment the invention comprises an opto-electronic receiver comprising a photodetector, a signal amplifier AC coupled to the photodetector, and a loss of signal circuit DC coupled to the photodetector. In one embodiment the signal amplifier comprises a transimpedance amplifier. In one embodiment the loss of signal circuit comprises a current to voltage circuit receiving a DC current signal and generating a DC voltage signal and a comparator comparing the DC voltage signal to a reference signal.

In a further embodiment the invention comprises an apparatus for generating a loss of signal signal for a photodetector circuit. The photodetector circuit is included in an opto-electronic receiver, with the photodetector circuit being AC coupled to an amplifier stage and the photodetector circuit generating a DC signal responsive to an optical signal. The apparatus comprises a current-to-voltage converter circuit receiving the DC signal from the photodetector circuit and generating a voltage signal in response to the DC signal, and a comparator circuit receiving a voltage signal from a current voltage converter circuit and generating an LOS signal. In a further embodiment the current-to-voltage converter further includes a current mirror circuit, a load resistor, and a voltage buffer circuit. In a further embodiment, the current to voltage converter circuit further includes a process and temperature compensator circuit.

In a further embodiment the invention comprises a method for generating a loss of signal signal for a photodetector circuit included in an opto-electronic receiver. In one embodiment the method comprises providing a current-to-voltage converter circuit preferably coupled to a photodetector circuit, providing a comparator circuit operably coupled to the current voltage converter circuit and receiving by the current-to-voltage converter circuit from the photodetector circuit a DC signal. The method further comprises generating by the current-to-voltage converter circuit a voltage signal in response to the DC signal, receiving by the comparator circuit the voltage signal, and generating by the comparator circuit an LOS signal.

In a further embodiment the invention comprises an apparatus for generating a loss of signal signal. The apparatus includes a current-to-voltage converter means coupled to the photodetector circuit for generating a voltage signal in response to a DC signal and comparator means coupled to the current-to-voltage converter means coupled to the current voltage converter means for generating a LOS signal in response to the voltage signal.

BRIEF DESCRIPTION OF THE DRAWINGS

These and other features, aspects, and advantages of the present invention will become better understood with regard to the following description and accompanying drawings where.

DETAILED DESCRIPTION OF THE INVENTION

Figure 1:
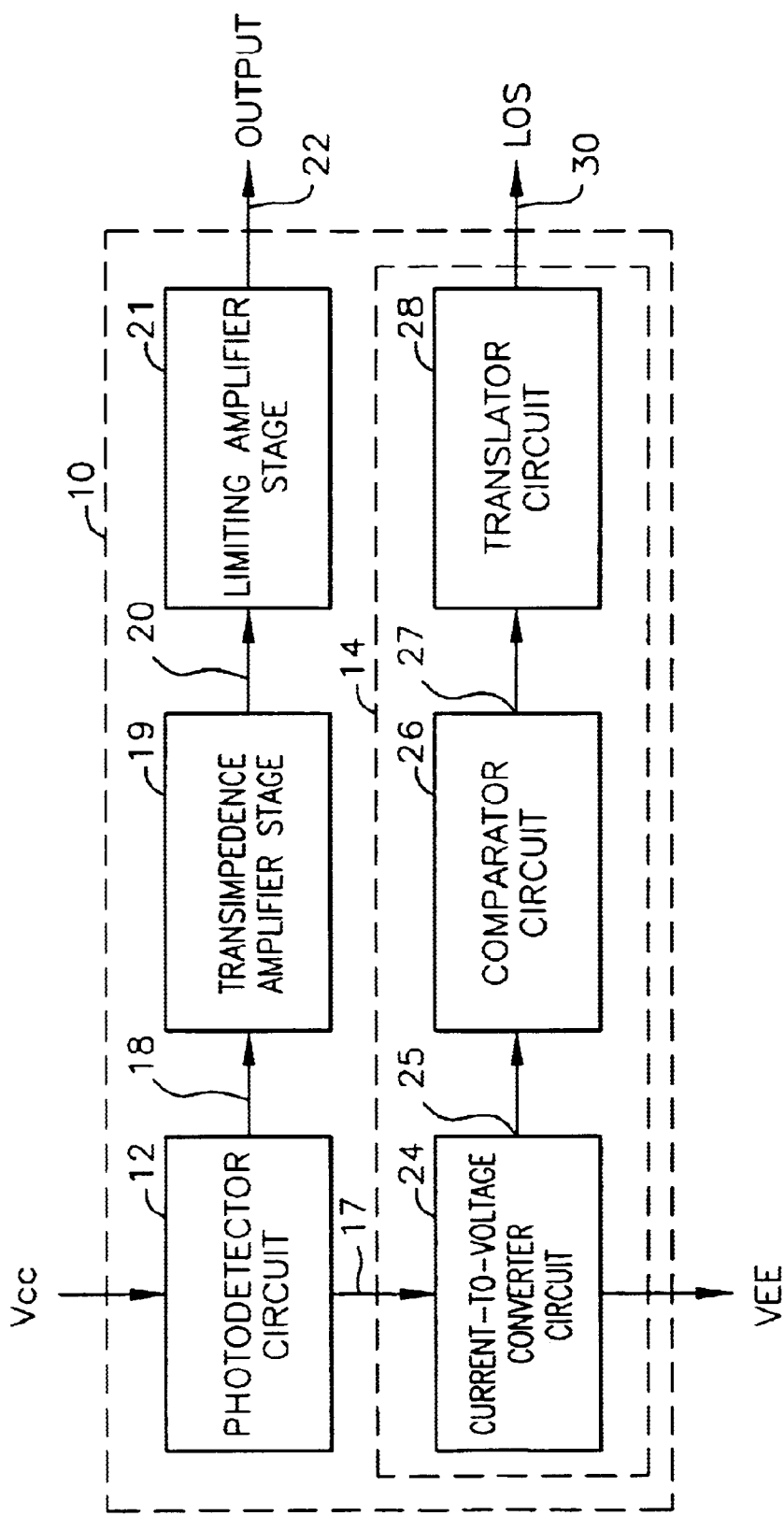
FIG. 1 is a block diagram of an opto-electronic receiver front-end including a Loss-Of-Signal (LOS) circuit in accordance with the present invention.

FIG. 1 is a block diagram of an embodiment of an opto-electronic receiver front-end 10 including a Loss-Of-Signal (LOS) circuit 14 in accordance with the present invention. The opto-electronic receiver front-end includes a photodetector circuit 12. The photodetector circuit receives an optical signal (not shown). In response to the optical signal the photodetector generates a photodetector signal.

The photodetector signal includes an AC component 18 and a DC component 17.

The AC component of the photodetector signal is provided to a transimpedance amplifier stage 19. The transimpedance amplifier stage amplifies the AC component of the photodetector signal and generates an AC voltage signal 20. The AC voltage signal is provided to a limiting amplifier stage 21. The limiting amplifier stage conditions the AC voltage signal to create an output signal 22.

The DC component of the photodetector signal is provided to the LOS circuit 14. The LOS circuit generates an adjusted LOS signal 30 using the DC component of the photodetector signal. The adjusted LOS signal includes a state indicating the presence of an optical signal and a state indicating a loss of the optical signal.

The LOS circuit includes a current-to-voltage converter circuit 24. The current to voltage converter circuit receives the DC component of the photodetector signal generated by the photodetector circuit. The current-to-voltage converter circuit uses the DC component of the photodetector signal to generate a DC voltage signal 25. The DC voltage signal is provided to a comparator circuit 26. The comparator circuit 26 compares the DC voltage signal to a reference voltage signal and generates a LOS signal 27. The LOS signal is provided to a translator circuit 28. The translator circuit receives the LOS signal and generates an adjusted LOS signal 30. The output levels of the adjusted LOS signal are compatible with standard digital logic levels.

Figure 2:
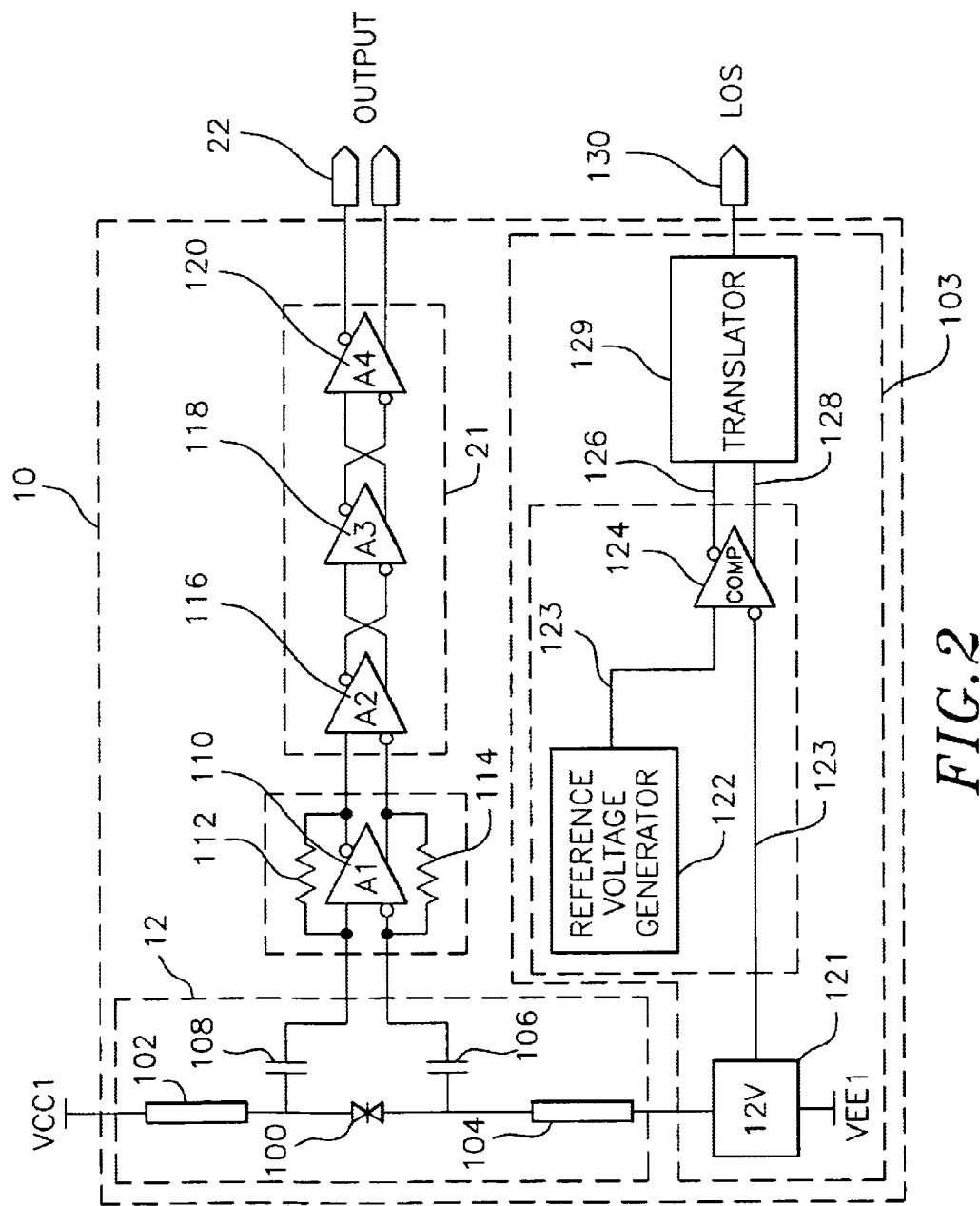
FIG. 2 is a block diagram of an opto-electronic receiver front-end including a LOS circuit in accordance with the present invention.

FIG. 2 is a block diagram of an embodiment of an opto-electronic receiver front-end including a Loss-Of-Signal (LOS) circuit. A photodetector circuit 12 includes a photodetector 100. The photodetector receives optical signals (not shown). A first end of the photodetector is coupled to a first biasing circuit 102, and a second end of the photodetector is coupled to a second bias circuit 104. The first biasing circuit is between a voltage source and the photodetector. The second biasing circuit is between a LOS circuit and the photodetector. The LOS circuit is therefore DC coupled to the photo detector.

The first end of the photodetector is also coupled to a first capacitor 108. The second end of the photodetector is also coupled to a second capacitor 106. The capacitors provide signals to a transimpedance amplifier 110, with the capacitors blocking DC components of the signals. The transimpedance amplifier is therefore AC coupled to the photodetector, with the signals forming a differential signal.

Feedback for the transimpedance amplifier is provided by a first feedback resistor 112 and a second feedback resistor 114. The differential transimpedance amplifier stage converts the AC current signal to an amplified AC voltage signal, and provides the amplified AC voltage signal to a limiting amplifier stage 21. The limiting amplifier stage includes a first, second, and third limiting amplifiers 116, 118, 120 operably coupled in series. The limiting amplifiers receive the amplified AC voltage signal and generate an output signal whose amplitude is conditioned by the limiting amplifiers.

The LOS circuit 103 coupled to the photodetector circuit includes a monolithic current to voltage converter circuit 121. The current to voltage converter circuit receives a DC component of the photodetector signal from the photodetector circuit. The current to voltage converter circuit amplifies the DC current signal, and generates a DC voltage signal 123 from the DC current signal. The current to voltage converter provides the DC voltage signal to a comparator.

The comparator circuit also receives a reference voltage signal 123 generated by a reference voltage generator 122. The comparator compares the DC voltage signal with the reference voltage signal. If the DC voltage signal is higher than reference voltage signal, the comparator generates a differential LOS signal including a high voltage signal at a non-inverting output 126 and a low voltage signal at an inverting output 128. A level translator circuit 129 receives the differential LOS signal and generates an adjusted LOS signal 130 whose output levels are compatible with standard digital logic levels.

Figure 4:
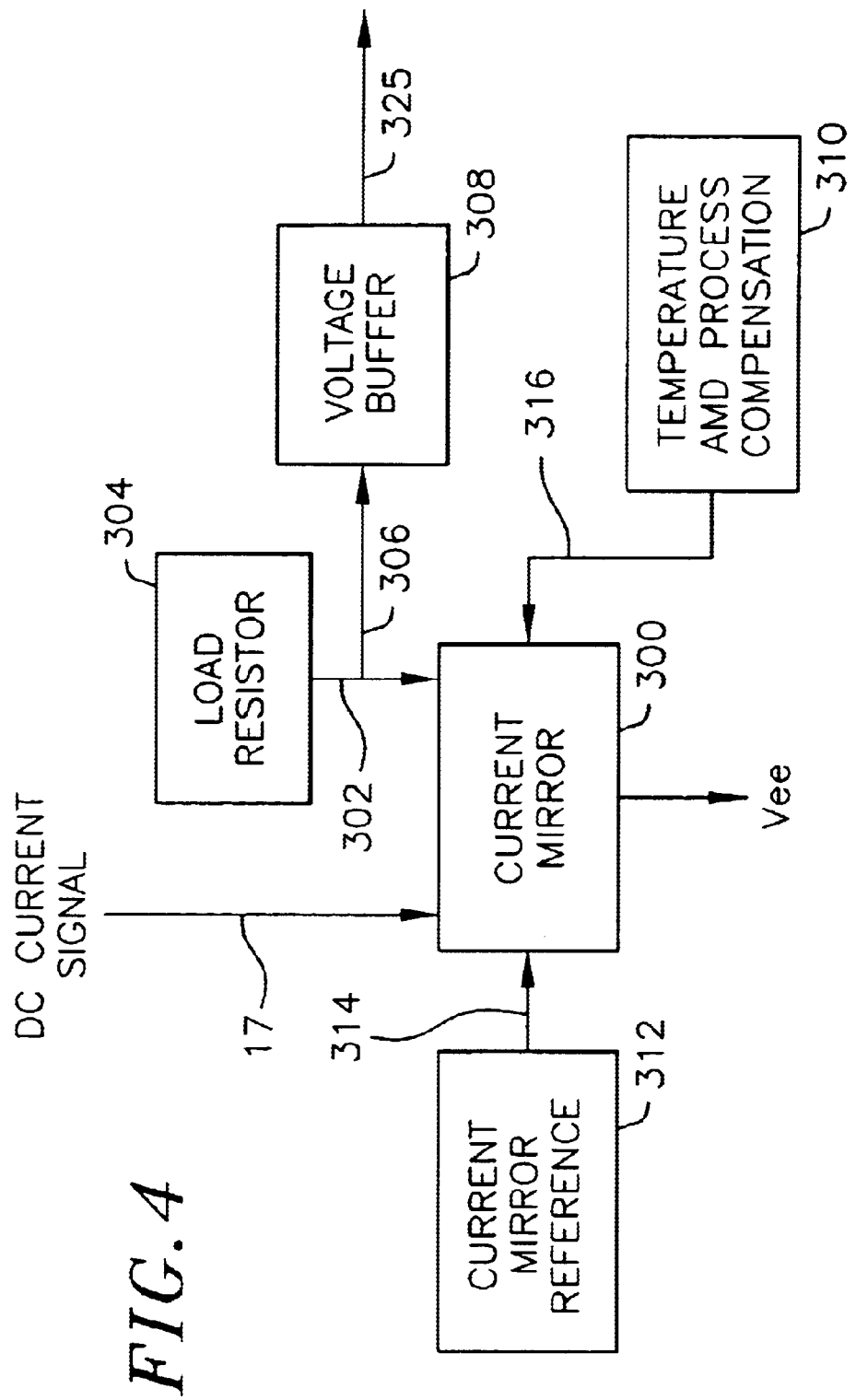
FIG. 4 is a block diagram of a current to voltage convertor circuit in accordance with the present invention.

FIG. 4 is a block diagram of a current-to-voltage convertor circuit in accordance with an embodiment of the present invention. The current-to-voltage converter circuit is implemented using MESFET technology. The current-to-voltage convertor circuit receives a DC current signal 17. The DC current signal is provided to a current mirror 300. In addition, the current mirror receives a current mirror reference signal 314 and a temperature and process compensation signal 316. The current mirror reference signal is generated by a current mirror reference generator 312. The temperature and process compensation signal is generated by a temperature and process compensation signal generator 310.

The current mirror uses the DC current signal, the current mirror reference signal, and the process and temperature compensation signal to generate an intermediate DC current signal 302. The intermediate DC current signal flows through a load resistor 304. The intermediate DC current signal current flowing through the load resistor creates an intermediate DC voltage signal 306 that is received by a voltage buffer 308. The voltage buffer generates a DC voltage signal 325 using the intermediate DC voltage signal. The DC voltage signal is then made available for further processing within the LOS circuit.

Figure 5:
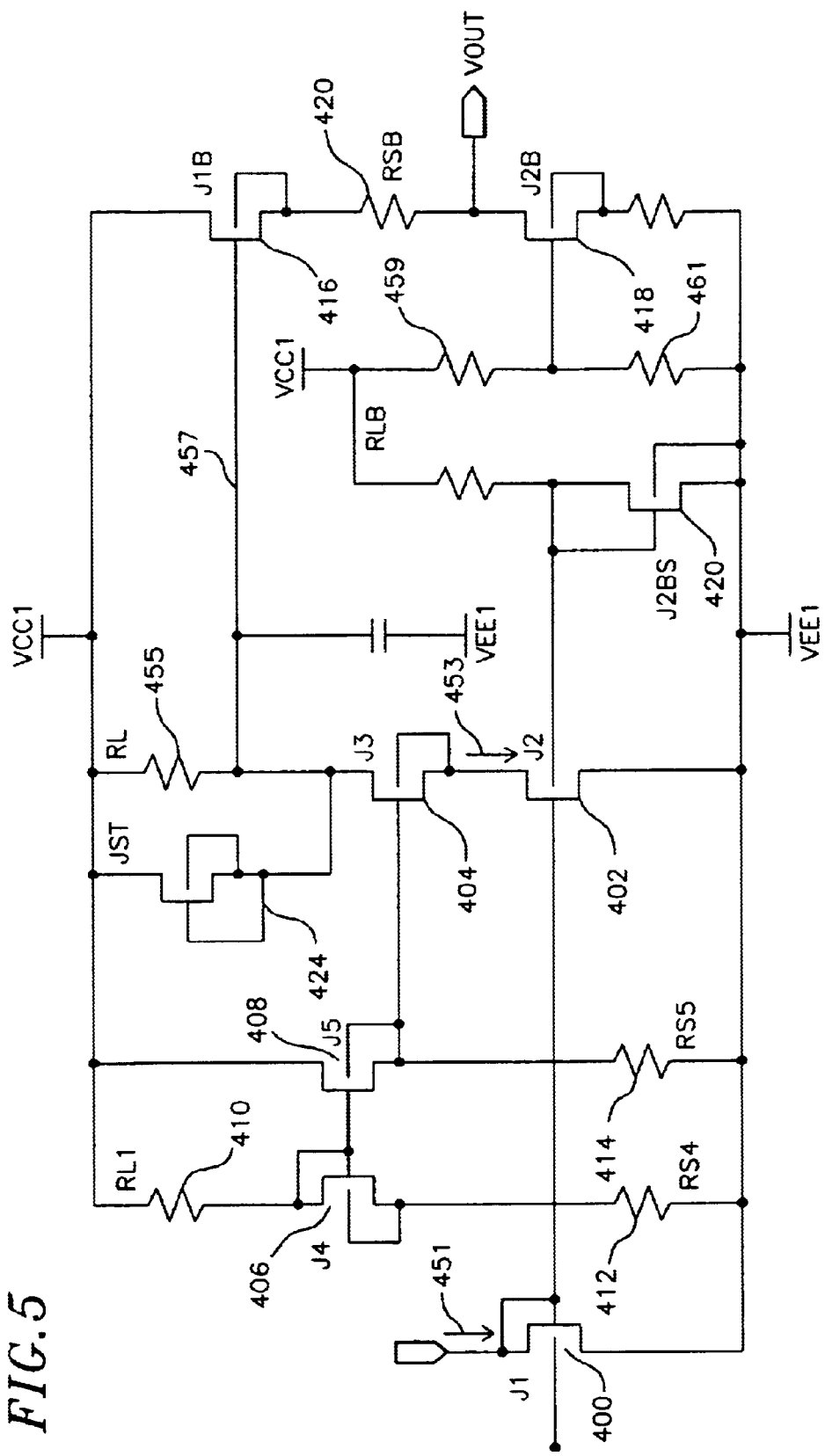
FIG. 5 is a circuit schematic of a current to voltage convertor circuit in accordance with the present invention.

FIG. 5 is a schematic diagram of an embodiment of a current to voltage convertor circuit used within an exemplary embodiment of a LOS circuit in accordance with aspects of the present invention. A cascoded current mirror is formed by transistors J1 400, J2 402, and J3 404. A DC current signal 451 flows through transistor J1 and generates an intermediate DC current signal 453 flowing through transistor J2. The intermediate DC current signal also flows through transistor J3, which forms the cascode transmitter. The base of transistor J3 is coupled to a current mirror reference.

The current mirror reference includes transistors J4 406 and J5 408, with transistors J4 and J5 being gate coupled and forming a current mirror with the gate at J4 also coupled to the drain of J4. Resistors RS4 412 and RS5 414 are coupled to the sources of transisters J4 and J5. The drain of transister J4 is coupled to resistor RL1 410. The source of transistor J5 is coupled to the gate of transistor J3.

The intermediate DC current signal also flows through load resistor RL 455 thus generating an intermediate DC voltage signal 457. The intermediate DC voltage signal is applied to an output buffer. The output buffer is formed of a stacked transistor pair J1B 416 and J2B 418, with a level shifting resistor RSB 420 between the transistors J1B and J2B. The gate of transistor J1B receives the intermediate voltage signal. The gate of resistor J2B receives a voltage signal from the midpoint of a voltage divider formed of resistors 459 and 461.

The current to voltage convertor circuit utilizes substrate drive on transistors J1 and J2 to reduce current gain variation created by variations in manufacturing processes used to manufacture the current to voltage convertor circuit, as well as for temperature variations. The substrate of transistors J1 and J2 is coupled to a network formed of resistor RLB 422 and transistor J2BS 420. The drain of transister J2BS provides the substrate bias control signals. The transistor J2BS is coupled to a voltage source by a bias resistor RLB. The gate of the transistor J2BS is drain coupled. The voltage at the drain of transistor J2BS, therefore is dependent on the threshold voltage of the device. The substrate bias control voltage is at a high level when transistor J2BS has a high threshold voltage and is at a low level when J2BS has a low threshold voltage. Resistor RLB is used to bias transistor J2BS in the saturation region.

Transistor JST 424 is used to compensate for sub-threshold currents generated by transistor J2 when there is no input current at the drain of transistor J1 or when the gate-to-source voltage of J2 is zero. The drain of transistor JST is coupled to Vcc and the source is coupled to the drain of transistor J3. Sub-threshold currents may become quite large at high temperatures and hot corners of the process and cause the DC voltage signal 25 to be pulled well below that of the reference voltage signal 123 (FIG. 2). This may produce a false indicator that there is an optical signal received by the photodetector circuit 12 (FIG. 1) even though there is none.

Figure 3:
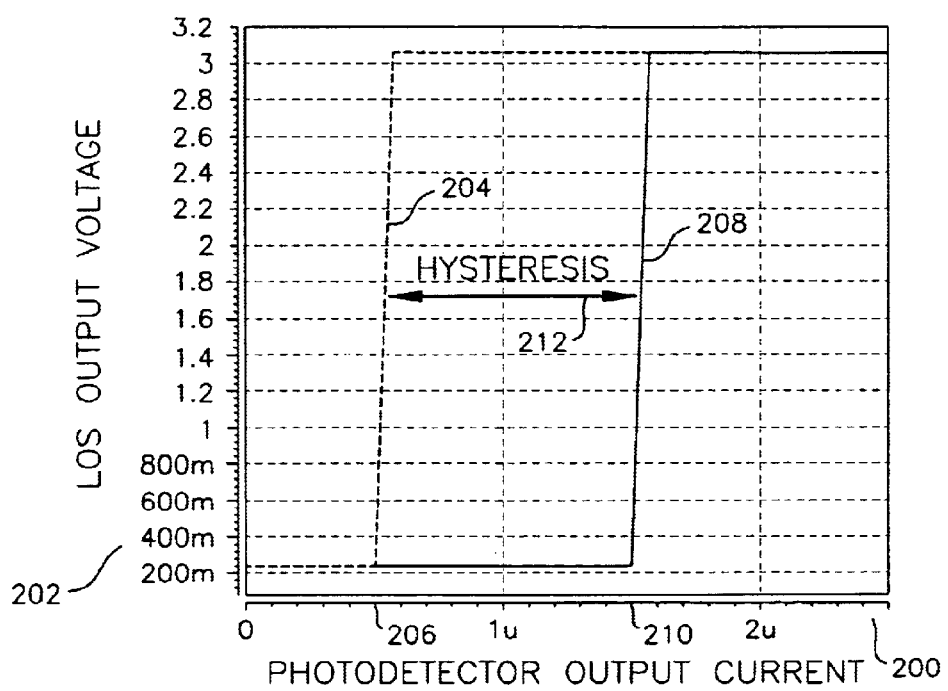
FIG. 3 is a graph showing the hysteresis of a comparator circuit in accordance with the present invention.

The comparator stage includes hysteresis to prevent chatter when the DC voltage signal is noisy and is close to the reference voltage signal. FIG. 3 is a graph showing the hysteresis of an exemplary embodiment of a LOS circuit including a comparator circuit with hysteresis in accordance with the present invention. An independent axis 200 represents photodetector current output, and a dependent axis 202 shows a LOS signal voltage. A high LOS signal voltage level indicates that an optical signal is present, and a low LOS voltage signal indicates that no optical signal is present. A high-to-low transition 204 indicates a de-assert current level 206 and a low-to-high transition 208 indicates an assert current level 210. A spread between the de-assert and assert current levels 212 is a measure of the hysteresis of the comparator circuit included in the LOS circuit.

Although this invention has been described in certain specific embodiments, many additional modifications and variations would be apparent to those skilled in the art. For example, it would be clear to those skilled in the art that even though a exemplary embodiment of a LOS circuit has been presented based on GaAs MESFET technologies, other embodiments of a LOS circuit in accordance with the present invention may also be implemented using many other technologies. It is therefore to be understood that this invention may be practiced otherwise than as specifically described. Thus, the present embodiments of the invention should be considered in all respects as illustrative and not restrictive, the scope of the invention to be determined by claims supported by this application and the claims' equivalents rather than the foregoing description.

What is claimed is:

1. A loss of signal circuit in an opto-electronic receiver, the opto-electronic receiver having a transimpedance amplifier AC coupled to a photodetector, the loss of signal circuit comprising:

a current to voltage circuit DC coupled to the photodetector, the current to voltage circuit comprising a current mirror receiving a DC current signal generated by the photodetector and providing an intermediate DC voltage signal; and a comparator coupled to the current to voltage circuit, the comparator receiving the intermediate DC voltage signal and providing a loss of signal signal.

2. The loss of signal circuit of claim 1 wherein current mirror includes transistors, and at least some of the transistors receive a substrate drive signal.

3. The loss of signal circuit of claim 2 wherein the substrate drive signal is provided by a process and temperature sensor.

4. A loss of signal circuit in an opto-electronic receiver, the opto-electronic receiver having a transimpedance amplifier ac coupled to a photodetector, the loss of signal circuit comprising:

a current to voltage circuit dc coupled to the photodetector, the current to voltage circuit receiving a dc current signal generated by the photodetector and providing a dc voltage signal, the current to voltage circuit comprising a current mirror receiving the dc current signal and providing an intermediate dc voltage signal, the current mirror including transistors, and at least some of the transistors receive a substrate drive signal provided by a process and temperature sensor, the process and temperature sensor comprising a resistor and a transistor, the resistor coupled to the drain of the transistor and the substrate drive signal being formed at the drain of the transistor; and a comparator coupled to the current to voltage circuit, the comparator receiving the dc voltage signal and providing a loss of signal signal.

5. The loss of signal circuit of claim 4 wherein the current mirror is a cascoded current mirror.

6. The loss of signal circuit of claim 5 further comprising sub-threshold current compensator transistor coupled to the current mirror.

7. An apparatus for generating a Loss Of Signal (LOS) signal for a photodetector circuit included in an opto-electronic receiver, the photodetector circuit being AC coupled to an amplifier stage included in the opto-electronic receiver, the photodetector circuit generating a DC signal responsive to an optical signal, the apparatus comprising:

a current to voltage converter circuit receiving the DC signal from the photodetector circuit, the current to voltage converter circuit generating a voltage signal in response to the DC signal, the current to voltage converter comprising;

a current mirror circuit receiving the DC signal, the current mirror circuit generating an intermediate current signal in response to the DC signal;

a load resistor operably coupled to the current mirror circuit, the intermediate current signal flowing through the load resistor generating an intermediate voltage signal; and a voltage buffer circuit receiving the intermediate voltage signal, the voltage buffer circuit generating the voltage signal; and a comparator circuit receiving the voltage signal from the current to voltage converter circuit, the comparator circuit generating a LOS signal in response to the voltage signal.

8. The apparatus of claim 7, wherein the current to voltage converter circuit further includes a process and temperature sensor circuit generating a temperature and process compensation signal received by the current mirror circuit.

9. An apparatus for generating a Loss Of Signal (LOS) signal for a photodetector circuit included in an opto-electronic receiver, the photodetector circuit being AC coupled to an amplifier stage included in the opto-electronic receiver, the photodetector circuit generating a DC signal responsive to an optical signal, the apparatus comprising:

a current to voltage converter circuit receiving the DC signal from the photodetector circuit, the current to voltage converter circuit generating a voltage signal in response to the DC signal;

a comparator circuit receiving the voltage signal from the current to voltage converter circuit, the comparator circuit generating a LOS signal in response to the voltage signal; and a translator circuit receiving the LOS signal from the comparator circuit, the translator circuit generating an adjusted LOS signal from the LOS signal.

10. An apparatus for generating a Loss Of Signal (LOS) signal for a photodetector circuit included in an opto-electronic receiver, the photodetector circuit being AC coupled to an amplifier stage included in the opto-electronic receiver, the photodetector circuit generating a DC signal responsive to an optical signal, the apparatus comprising:

a current to voltage converter circuit receiving the DC signal from the photodetector circuit, the current to voltage converter circuit generating a voltage signal in response to the DC signal; and a comparator circuit receiving the voltage signal from the current to voltage converter circuit, the comparator circuit generating a LOS signal in response to the voltage signal, the comparator circuit including:

a reference voltage generator circuit, the reference voltage generator circuit generating a reference voltage signal; and a comparison stage receiving the reference voltage signal and the voltage signal, the comparison stage generating the LOS signal by comparing the voltage signal to the reference voltage signal.

11. A method for generating a Loss Of Signal (LOS) signal for a photodetector circuit included in an opto-electronic receiver, the photodetector circuit AC coupled to an amplifier stage included in the opto-electronic receiver, the photodetector circuit generating a DC signal responsive to an optical signal, the method comprising:

providing a current to voltage converter circuit operably coupled to the photodetector circuit, the current to voltage converter circuit comprising a current mirror circuit operably coupled to a load resistor and a voltage buffer circuit;

providing a comparator circuit operably coupled to the voltage buffer circuit of the current to voltage converter circuit;

receiving by the current mirror circuit of the current to voltage converter circuit from the photodetector circuit the DC signal;

generating by the current mirror circuit an intermediate current signal in response to the DC signal;

generating an intermediate voltage signal by flowing the intermediate current signal through the load resistor;

receiving by the voltage buffer circuit the intermediate voltage signal;

generating by the voltage buffer circuit a voltage signal;

receiving by the comparator circuit from the voltage buffer circuit the voltage signal; and generating by the comparator circuit from the voltage signal a LOS signal.

12. The method of claim 11, wherein the current to voltage converter circuit further includes a process and temperature sensor circuit, the method further comprising:

generating by the process and temperature sensor circuit a temperature and process compensation signal;

receiving by the current mirror circuit the temperature and process compensation signal; and generating by the current mirror circuit the voltage signal using the temperature and process compensation signal and the current signal.

13. A method for generating a Loss Of Signal (LOS) signal for a photodetector circuit included in an opto-electronic receiver, the photodetector circuit AC coupled to an amplifier stage included in the opto-electronic receiver, the photodetector circuit generating a DC signal responsive to an optical signal, the method comprising:

providing a current to voltage converter circuit operably coupled to the photodetector circuit;

providing a comparator circuit operably coupled to the current to voltage converter circuit;

providing a translator circuit operably coupled to the comparator circuit;

receiving by the current to voltage converter circuit from the photodetector circuit the DC signal;

generating by the current to voltage converter circuit a voltage signal in response to the DC signal;

receiving by the comparator circuit from the current to voltage converter circuit the voltage signal;

generating by the comparator circuit from the voltage signal a LOS signal; and receiving by the translator circuit the LOS signal from the comparator circuit, the translator circuit generating an adjusted LOS signal from the LOS signal.

14. A method for generating a Loss Of Signal (LOS) signal for a photodetector circuit included in an opto-electronic receiver, the photodetector circuit AC coupled to an amplifier stage included in the opto-electronic receiver, the photodetector circuit generating a DC signal responsive to an optical signal, the method comprising:

providing a current to voltage converter circuit operably coupled to the photodetector circuit;

providing a comparator circuit operably coupled to the current to voltage converter circuit, the comparator circuit including, a reference voltage generator circuit and a comparison stage operably coupled to the reference voltage generator circuit;

receiving by the current to voltage converter circuit from the photodetector circuit the DC signal;

generating by the current to voltage converter circuit a voltage signal in response to the DC signal;

generating by the reference voltage generator circuit a reference voltage signal;

receiving by the comparison stage the reference voltage signal;

receiving by the comparison stage from the current to voltage converter circuit the voltage signal; and generating by the comparison stage the LOS signal by comparing the voltage signal to the reference voltage signal.

15. An apparatus for generating a Loss Of Signal (LOS) signal for a photodetector circuit included in an opto-electronic receiver, the photodetector circuit AC coupled to an amplifier stage included in the opto-electronic receiver, the photodetector circuit generating a DC signal responsive to an optical signal, the apparatus comprising current to voltage converter means operably coupled to the photodetector circuit for generating a voltage signal in response to the DC signal, comprising:

current mirror means for generating an intermediate current signal in response to the DC signal;

resistor means operably coupled to the current mirror means for generating an intermediate voltage signal in response to the intermediate current signal; and voltage buffer means operably coupled to the resistor means for generating a voltage signal from the intermediate voltage signal; and comparator means operably coupled to the current to voltage converter means for generating a LOS signal in response to the voltage signal.

16. An apparatus for generating a Loss Of Signal (LOS) signal for a photodetector circuit included in an opto-electronic receiver, the photodetector circuit AC coupled to an amplifier stage included in the opto-electronic receiver, the photodetector circuit generating a DC signal responsive to an optical signal, the apparatus comprising:

current to voltage converter means operably coupled to the photodetector circuit for generating a voltage signal in response to the DC signal, the current to voltage converter means further including a process and temperature sensor means operably coupled to a current mirror means for generating a temperature and process compensation signal received by the current mirror means; and comparator means operably coupled to the current to voltage converter means for generating a LOS signal in response to the voltage signal.

17. An apparatus for generating a Loss Of Signal (LOS) signal for a photodetector circuit included in an opto-electronic receiver, the photodetector circuit AC coupled to an amplifier stage included in the opto-electronic receiver, the photodetector circuit generating a DC signal responsive to an optical signal, the apparatus comprising:

current to voltage converter means operably coupled to the photodetector circuit for generating a voltage signal in response to the DC signal;

comparator means operably coupled to the current to voltage converter means for generating a LOS signal in response to the voltage signal; and translator means operably coupled to the comparator means for generating an adjusted LOS signal from the LOS signal.

18. An apparatus for generating a Loss Of Signal (LOS) signal for a photodetector circuit included in an opto-electronic receiver, the photodetector circuit AC coupled to an amplifier stage included in the opto-electronic receiver, the photodetector circuit generating a DC signal responsive to an optical signal, the apparatus comprising:

current to voltage converter means operably coupled to the photodetector circuit for generating a voltage signal in response to the DC signal; and comparator means operably coupled to the current to voltage converter means for generating a LOS signal in response to the voltage signal, the comparator means including:

reference voltage generator means for generating a reference voltage signal; and comparison means operably coupled to the reference voltage generator means for comparing the voltage signal to the reference voltage signal.

* * * * *